United States Patent
Croix et al.

(10) Patent No.: US 9,004,010 B2
(45) Date of Patent: Apr. 14, 2015

(54) ULTRASONIC NOISE DEVICE

(71) Applicant: Quaker Pet Group, LLC, Denver, CO (US)

(72) Inventors: Michael Croix, Seattle, WA (US); Leslie Watts, Tiger, GA (US)

(73) Assignee: Lucid Designs LLC, Seattle, WA (US)

( * ) Notice: Subject to any disclaimer, the term of this patent is extended or adjusted under 35 U.S.C. 154(b) by 96 days.

(21) Appl. No.: 13/938,953

(22) Filed: Jul. 10, 2013

(65) Prior Publication Data

US 2014/0033988 A1  Feb. 6, 2014

Related U.S. Application Data

(60) Provisional application No. 61/677,927, filed on Jul. 31, 2012.

(51) Int. Cl.
  *A01K 15/02* (2006.01)
  *A63H 5/00* (2006.01)
  *G10K 5/02* (2006.01)

(52) U.S. Cl.
  CPC .............. *A01K 15/025* (2013.01); *G10K 5/02* (2013.01)

(58) Field of Classification Search
  USPC .......... 119/707, 712, 719; 446/202, 204, 397, 446/183, 184, 188
  See application file for complete search history.

(56) References Cited

U.S. PATENT DOCUMENTS

| | | | |
|---|---|---|---|
| 2,245,484 A * | 6/1941 | Leavens ....................... 446/205 |
| 2,737,757 A | 3/1956 | Liebelt | |
| 2,927,399 A | 3/1960 | Bacon | |
| 3,072,097 A | 1/1963 | Morchand | |
| 3,277,861 A * | 10/1966 | Moe ......................... 116/137 R |
| 3,980,051 A | 9/1976 | Fury | |
| 5,575,240 A * | 11/1996 | Udelle et al. .................. 119/707 |
| 5,816,885 A * | 10/1998 | Goldman et al. ............. 446/397 |
| 6,109,202 A | 8/2000 | Topman et al. | |

(Continued)

FOREIGN PATENT DOCUMENTS

| DE | 7206995 U | 7/1972 |
|---|---|---|
| DE | 19827513 A1 | 12/1999 |

(Continued)

OTHER PUBLICATIONS

Author Unknown, Acme Dog Whistles, GunDogsOnline.com as early as Dec. 31, 2003, Retrieved from the Internet URL:http://web.archive.org/web/20031231164432/http://gundogsonline.com/Dept.asp?iDeptID=800.

(Continued)

*Primary Examiner* — Yvonne Abbott
(74) *Attorney, Agent, or Firm* — Dorsey & Whitney LLP

(57) ABSTRACT

An ultrasonic noise device that can be used as an animal entertainment device and/or animal training device. The ultrasonic noise device includes a compressible bladder defining an air retaining cavity and a nozzle operably connected to the bladder and fluidly connected to the air retaining cavity. The nozzle including a nozzle flow pathway extending from a first end of the nozzle to a second end of the nozzle. The ultrasonic noise device also includes a resonator operably connected to the nozzle and defining a resonator flow pathway in fluid communication with the nozzle flow pathway and a pin positioned at least partially within the nozzle flow pathway and aligned with the nozzle flow pathway and a first end of the pin extends towards but does not reach a tip of the nozzle.

20 Claims, 10 Drawing Sheets

(56) References Cited

U.S. PATENT DOCUMENTS

| | | | |
|---|---|---|---|
| 6,698,377 | B1 | 3/2004 | Topman et al. |
| 7,357,693 | B1 | 4/2008 | Roberts |
| 7,781,944 | B2 | 8/2010 | Shkolnikov et al. |
| 2002/0129774 | A1* | 9/2002 | Strongin ................ 119/707 |
| 2005/0136790 | A1 | 6/2005 | Hall et al. |
| 2005/0148280 | A1 | 7/2005 | Primos et al. |
| 2008/0072842 | A1 | 3/2008 | King |
| 2009/0205582 | A1 | 8/2009 | Kitchens |
| 2011/0048338 | A1* | 3/2011 | Specht ................... 119/709 |

FOREIGN PATENT DOCUMENTS

| | | |
|---|---|---|
| DE | 20110708 U1 | 12/2001 |
| DE | 20313319 U1 | 10/2003 |
| GB | 468821 | 7/1937 |
| GB | 486417 A | 6/1938 |
| JP | 11223054 A | 8/1999 |
| JP | 2004252132 A | 9/2004 |
| JP | 2007013413 A | 1/2007 |
| WO | 2007000617 A1 | 1/2007 |
| WO | 2009129763 A1 | 10/2009 |

OTHER PUBLICATIONS

Author Unknown, The Dog Dazer II, Electronic Pest Control Pro as early as Mar. 17, 2011, Retrieved from the Internet URL:http://web.archive.org/web/20110317091843/http://electronicpestcontrolpro.com/mm5/merchant.mvc?Screen=PROD&Store_Code=pestcontrol&Product_Code=DAZX&At.

Author Unknown, Dog Whistle—Acme 640 Combination, Abrivo Sports, as early as Dec. 8, 2010, Retrieved from the Internet from http://web.archive.org/web/20101208070046/http://abrivosports.com/.

Author Unknown, Dog Whistle, Abrivo Sports, as early as Mar. 20, 2009, Retrieved from the Internet from URL:http://web.archive.org/web/20090320235614/http://www.abrivosports.com/.

Author Unknown, Lucky Dog European Style Whistle, GunDogSupply.com as early as Mar. 26, 2006, Retrieved from the Internet URL:http://web.archive.org/web/20060326231055/http://www.gundogsupply.com/euro-silent-whistle.html.

Author Unknown, Pete Rickard's Dual-Tone Dog Whistle as early as Oct. 17, 2000, Retrieved from the Internet URL:http://web.archive.org/web/20001017100825/http://www.peterickard.com/DOGTRAINING.html.

* cited by examiner

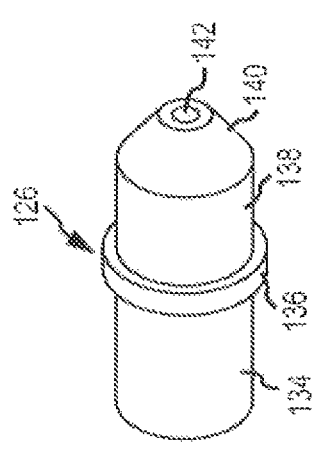
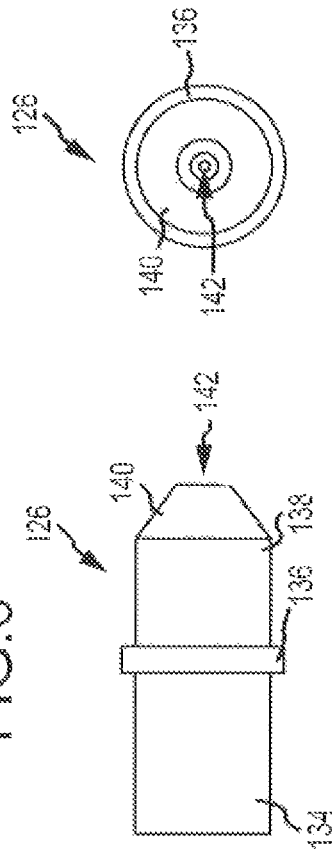
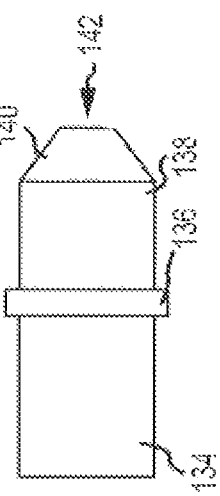
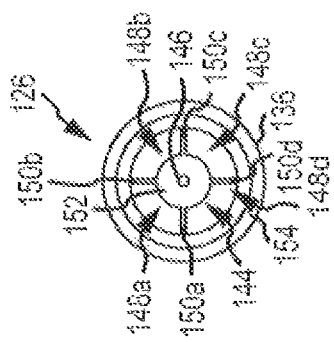

ULTRASONIC NOISE DEVICE

PRIORITY TO PROVISIONAL APPLICATION

This application claims priority to U.S. Provisional Application No. 61/677,927 filed Jul. 31, 2012 entitled "Ultrasonic Noise Device," which is hereby incorporated by reference in its entirety for all purposes.

TECHNICAL FIELD

The present invention relates generally to noise producing devices, and more specifically, to whistle and noise devices for domestic animals.

BACKGROUND

Often people that own domestic animals, such as a dogs and cats, may provide their animals with toys, such as balls, stuffed animals, and the like. In some instances, generally with dogs, certain toys may include a squeaking or noise making element that may emit a noise while a dog is chewing or playing with the toy. For example, certain dog toys are stuffed animals that have a squealer such that when the dog bites on the toy a squeak is emitted. However, in many instances, the squeaking characteristic of these toys may be bothersome to people, especially in instances where the animals may play with the toys for an extended period of time.

SUMMARY

Examples of the disclosure may include an ultrasonic noise device that can be used as an animal entertainment device and/or animal training device. The ultrasonic noise device includes a compressible bladder defining an air retaining cavity and a nozzle operably connected to the bladder and fluidly connected to the air retaining cavity. The nozzle, including a nozzle flow pathway extending from a first end of the nozzle to a second end of the nozzle. The ultrasonic noise device also includes a resonator operably connected to the nozzle and defining a resonator flow pathway in fluid communication with the nozzle flow pathway and a pin positioned at least partially within the nozzle flow pathway and aligned with the nozzle flow pathway and a first end of the pin extends towards but does not reach a tip of the nozzle.

An animal entertainment device including a bladder defining a cavity for retaining air and an ultrasonic whistle fluidly connected to the bladder. The ultrasonic whistle includes a nozzle operably connected to the bladder, a resonator operably connected to the nozzle but spaced apart from a front end of the nozzle, and a pin operably connected to the resonator and terminating prior to the front end nozzle, and the pin includes a hemispherical shaped end oriented towards the nozzle. As the bladder is compressed air exits through the ultrasonic whistle and creates an ultrasonic sound.

BRIEF DESCRIPTION OF THE DRAWINGS

FIG. 6 is a side perspective view of a nozzle for the whistle of FIG. 5.

FIG. 7 is a front plan view of the nozzle of FIG. 6.

FIG. 8 is a rear plan view of the nozzle of FIG. 6.

FIG. 9 is a side elevation view of the nozzle of FIG. 6.

SPECIFICATION

Overview

Figure 1:
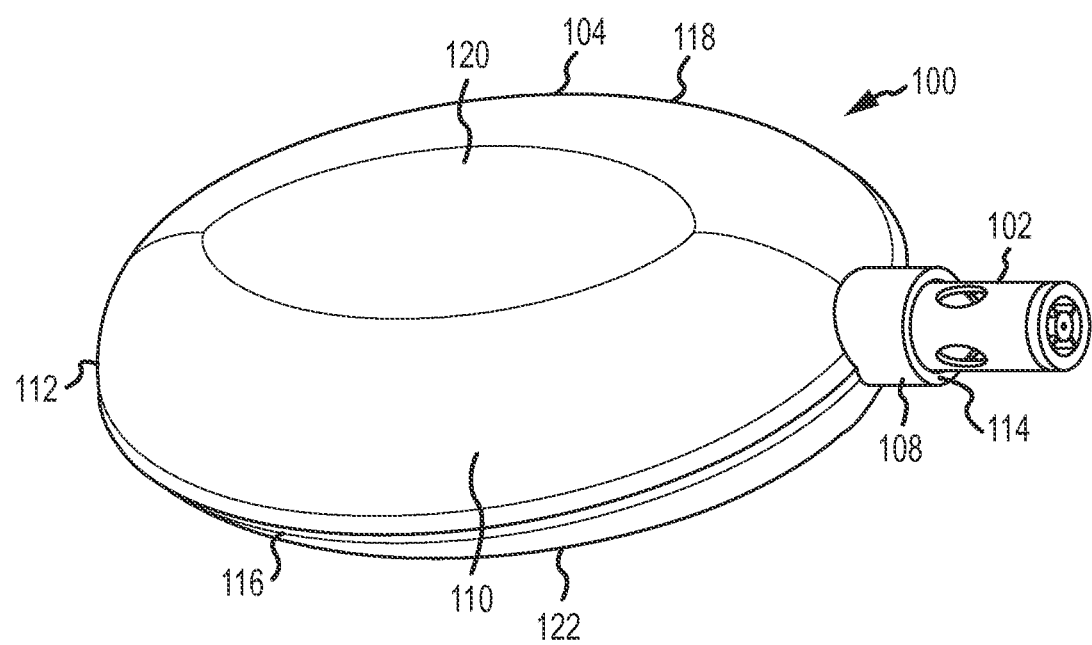
FIG. 1 is a side perspective view of an ultrasonic noise device.

In some embodiments herein, an ultrasonic noise device is disclosed. The ultrasonic noise device is configured to emit sounds in frequencies generally ranging between 22 to 23 kHz which are in the ultrasonic range. In these embodiments, sounds emitted from the noise device may be audible to certain animals, such as dogs, but may be inaudible to humans. The noise device may include a compressible bladder and a whistle. To emit sounds the bladder may be compressed (for example, by a user squeezing it or by an animal chewing on it), and air encompassed within the bladder may be expelled through the whistle. The whistle, as will be discussed in more detail below, may be shaped to create sounds having an ultrasonic frequency as air passes through it. In some instances, the configuration of the air flow passageways through the whistle may act to enhance resonator radiation, which rosy provide sufficient sound intensity to be audible and an ultrasonic frequency range.

In some embodiments, the whistle component may include a nozzle and a tip or resonator that are operably connected together, with the nozzle being configured to be received within the bladder. The whistle also includes a pin, which may be generally hemispherical on one end and oriented to be generally centered within the resonator. The pin may extend slightly past a flow opening or entrance of the resonator within an air flow path from the nozzle. The whistle may also include an outer sleeve that may operably connect the nozzle and the resonator together.

In some embodiments, the noise device may be incorporated into or otherwise operably connected to an exterior design or fabric, such as a stuffed toy, ball, bone, or the like. In these embodiments animals, such as dogs, can chew and/or play with the toy and be entertained and engaged as the noise maker may emit sounds to provide interaction or a response from the toy to the animals. Additionally, as the sounds emitted from the noise device are in the ultrasonic frequency range, the sounds may be inaudible to humans. This may help to prevent the animal owners or other humans in the range of the animal as it is chewing or playing with the toy from being, bothered with squeaking, whistles, or other sounds emitted by the noise maker.

In many embodiments, the noise device is configured to produce an ultrasonic sound with the pressure and air flow rate that can be produced with a bladder that may be blow molded and compressed to produce the air flow. Additionally, as described in more detail below, the whistle may not require exact precision in the placement and sizing of certain components, such as the pin, nozzle, and resonator. This may allow the noise making device to be manufactured in a relative low cost manner, especially as compared to conventional ultrasonic noise devices that generally require a significant amount of air pressure and flow rate, such that a compressible bladder made of light weight materials may not produce, and require exact alignment and dimension of certain components, such as the pin. Accordingly, embodiments disclosed herein may allow the noise making device to be used in animal toys, at a lower cost than other conventional ultrasonic noise devices.

Figure 2:
FIG. 2 is a front elevation view of a whistle of the ultrasonic noise device.
Figure 3:
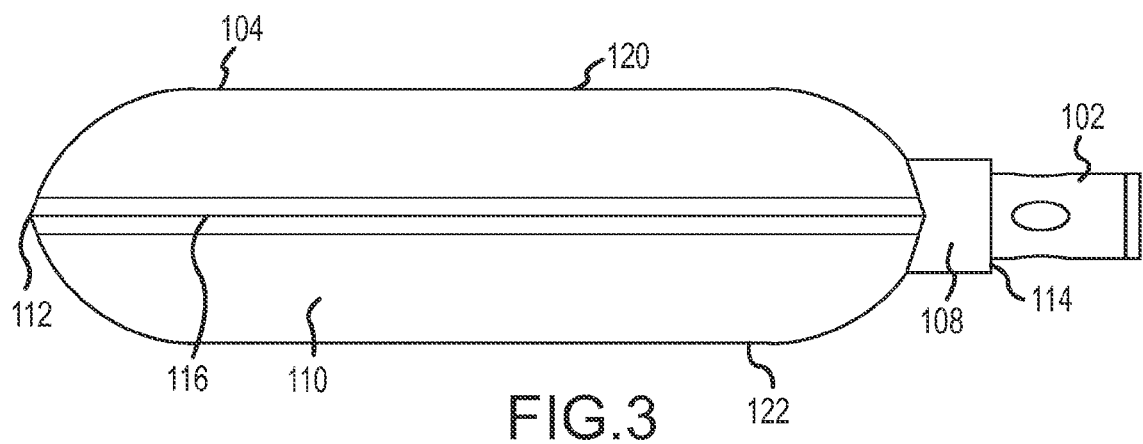
FIG. 3 is a side elevation view of the ultrasonic noise device of FIG. 1.

Turning now to the figures, the noise device will be discussed in more detail. FIG. 1 is a perspective view of the noise maker. FIG. 2 is a front elevation view of the noise maker. FIG. 3 is a side elevation view of the noise maker. The noise maker 100 may include a bladder 104 and a whistle 102. The whistle 102 may be in communication with the bladder 104, such that air may flow from the bladder 104 through the whistle 102 to the environment surrounding the noise maker 100.

In some embodiments, the bladder 104 may include a neck 106 extending from a first end 114 of a body 110. The body 110 has adjacent sidewalls 110, 118 and top and bottom surfaces 120, 122 that define an inner cavity. The inner cavity may store air, which may be expelled through the whistle 102 when the body 110 is compressed, as will be discussed in more detail below.

In some embodiments, the body 110 may have a generally oval or egg shape, and the sidewalls 116, 118 may convexly curve outwards as they extend between the top and bottom surfaces 120, 122. Additionally, the top and bottom surfaces 120, 122 may be convexly curved and may vary in height between the neck 108 and the rear end 112 of the body 110. For example, with reference to FIG. 1, a middle portion of the top surface 120 may have a vertical height higher than a portion of the top surface 120 adjacent the neck 108 and/or end portion 112.

The neck 108 may extend from the first end 114 of the body 110 and may have a generally cylindrical shape. However, in other embodiments, the neck 108 may have other shapes, but may generally be configured to receive at least a portion of the whistle 102. The neck 108 defines an inlet/outlet receiving aperture 124 which may receive a portion of the whistle 102. The receiving aperture 124 may provide an air flow path from the cavity of the body 110 to the whistle 102.

In some embodiments, the bladder 104 may be a single integral member; but in other embodiments, the bladder 104 may include two or more components operably connected together. Additionally, the bladder 104 may be formed of a generally resilient and compressible material, which may allow the bladder 104 to be deformed (such as through squeezing) and may resiliently return to its original shape. As one example, the bladder 104 may be a plastic material or rubber material, and may be formed through injection molding. As will be discussed in more detail below, the bladder 104 may be configured to provide a sufficient pressure and air flow rate as the body 110 is compressed to expel air through the receiving aperture 124 to activate the whistle 102.

It should be noted that although the bladder 104 as illustrated in FIGS. 1, 2, and 3 is shown having a particular shape that many other shapes and dimensions are envisioned. For example, a cylindrically shaped body 110 or a rectangular shaped body. Further, the neck may extend from the top or bottom surface 120 or one of the sidewalls 116, 118.

Figure 4:
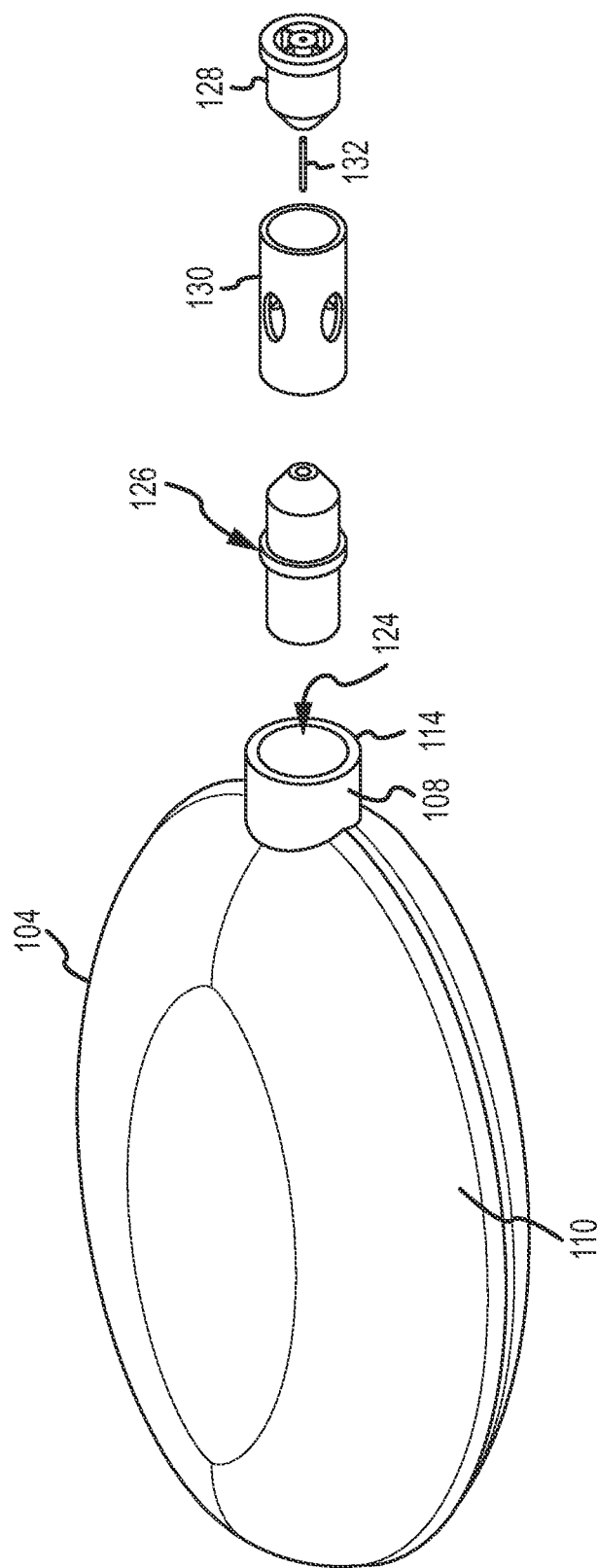
FIG. 4 is an exploded view of the ultrasonic noise device of FIG. 1.
Figure 5:
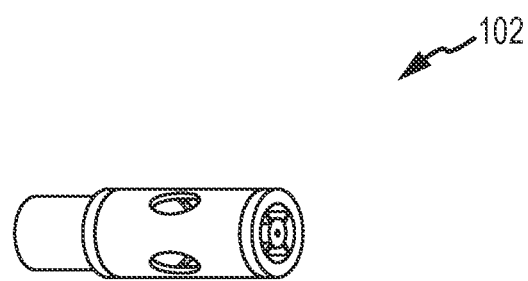
FIG. 5 is a front perspective view of the whistle of FIG. 2 removed from the ultrasonic noise device.

In some embodiments the whistle 102 may be at least partially received within the receiving aperture 124. FIG. 4 is an exploded view of the noise making device 100. The whistle 102 may include a nozzle 126, a resonator 128, a sleeve 130, and a pin 132. The nozzle 126 may be at least partially received within the receiving aperture 124 and provides a flow pathway from the bladder 104 to the resonator 128 and pin 132. The sleeve 130 may be received over at least a portion of the nozzle 126 and the resonator 128 and may operably connect the two components together. Each of the components will be discussed in turn below.

The nozzle 126 operably connects the whistle 102 to the bladder 104. FIG. 6 is a perspective view of the nozzle 126. FIG. 7 is a front plan view of the nozzle of FIG. 6. FIG. 8 is a rear plan view of the nozzle of FIG. 6. FIG. 9 is a side elevation view of the nozzle of FIG. 6. With respect to FIGS. 6-9, the nozzle 126 may include a base or connection cylinder 134 having a collar 136 separating the connection cylinder 134 from a top portion of the nozzle 126. The connection cylinder 134 may be a generally cylindrical member and as will be discussed in more detail below may be received within the receiving aperture 124 of the neck 108. The collar 136 may abut a terminal end of the neck 108 when the connection cylinder 134 is received within the neck 108 (see FIG. 1). An extension portion 138 may extend from the collar 136 and may have generally the same or substantially the same diameter as the connection cylinder 134.

With reference to FIGS. 7-9 a first end of the nozzle 126 may include a tip 140 that extends in a tapered manner from the extension portion 138. In some embodiments, the tip 140 may form a frustum or conical shape and may include a flow aperture 142 defined therethrough. The flow aperture 142 may extend through the entire nozzle 126, but may having varying diameters therethrough. For example, with brief reference to FIG. 19, at the tip 140, the diameter of the flow aperture 142 may be increased as compared to the diameter of the flow aperture 142 at other portions of the nozzle 126. In one example, the flow pathway through the tip may have a reverse taper as compared to the taper of the tip. In other words, the aperture may increase in diameter as it extends from the connection cylinder to the end of the tip.

As will be discussed in more detail below, the increase in diameter of the flow aperture 142 may create a non-choked flow in the nozzle 126 as air flows through the nozzle 126. In other words, choked flow only occurs at the smallest part of the nozzle, limiting the velocity at the smallest part of the nozzle sonic. When air leaves the choked portion, the increase in diameter of the flow aperture 142 may also increase the volume through which air is passing, which in turn may increase the velocity within the nozzle to supersonic. One may also appreciate that the pressure and velocity induced in the nozzle is related to the rate by which the bladder 104 is compressed. In other words, the bladder 104 must be compressed beyond a certain compression rate threshold in order to provide enough pressure to create the choked airflow at the smallest portion of the nozzle 126. In the event that the bladder 104 is compressed below the threshold, a choked flow will not occur which in turn may cause only subsonic airflow. One may appreciate that subsonic airflow can cause sound pressure waves to travel from the resonator back into the nozzle potentially emitting undesirable sound at human audible frequencies. By changing the length of the nozzle, the undesired sound resulting from a compression of the bladder 104 that is below the compression rate threshold may be mitigated. In certain embodiments, the length of the nozzle may be determined based at least in part by a selected bladder compression rate threshold.

The second end 144 of the nozzle 126 may include a number of apertures that may be fluidly connected to the flow aperture 142. A plurality of end apertures 148a, 148b, 146c, 145d may be defined by ribs 150a, 150b, 150c, 150d that extend from an inner surface of the connection cylindrical 134. The ribs 150a, 150b, 150c, 150d may operably connect a flow cylinder 152 to the connection cylinder 134. Accordingly, with reference to FIG. 8, the flow cylinder 152 may be positioned within the connection cylinder 134 but may be separated from the inner walls of the connection cylinder.

The flow cylinder 152 may include the flow passage 146 defined therethrough. With brief reference to FIG. 19, which is a cross-section view of the whistle 102, the flow passage 146 may have a generally consistent diameter defined through the nozzle 126, and towards the tip 140 the flow aperture 142 may connect to the flow passage 146. However, the flow aperture 142 may have an increased diameter as compared to the flow passage 146. In one embodiment, the sidewalls 158a, 158b may extend away from one another as they transition from the end of the flow passage 146 towards the tip 140. On some embodiments, the flow aperture 142 may begin to increase in size at the intersection of the extension portion 138 and the tip 140 and continuously extend outwards from the centerline of the flow passage 146 towards the end of the tip 140.

The flow passage 146 defined through the nozzle 126 may have a length from the inlet at the second end of the nozzle towards the outlet at the first end of the nozzle that may be configured to prevent resonant absorption. In other words, the flow passage length 146 may be sufficiently long to prevent air flow backwards from the resonator towards the bladder 104. In some embodiments, the flow passage 146 may have a length sufficient to prevent resonant absorption. Moreover, the flow passage may have a diameter that may be sufficiently large to provide a flow velocity sufficient to prevent resonant absorption as the flow passage diameter may effect a shock wave velocity as air exits the nozzle.

Figure 13:
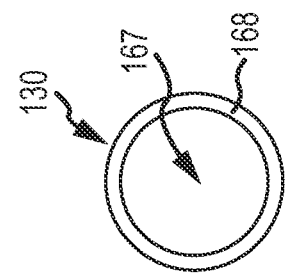
FIG. 13 is a rear plan view of the sleeve of FIG. 10.
Figure 10:
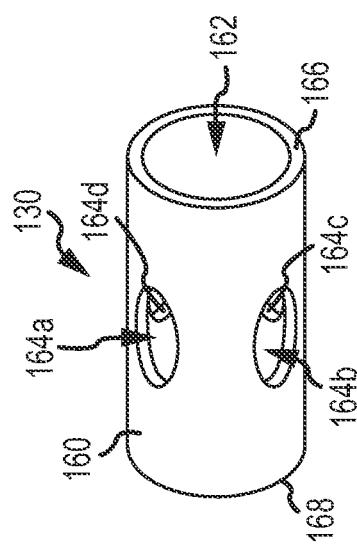
FIG. 10 is a side perspective view of a sleeve lot the whistle of FIG. 2.
Figure 12:
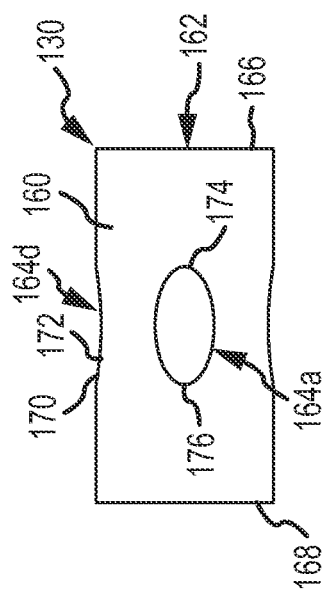
FIG. 12 is a side elevation view of the sleeve of FIG. 10.
Figure 11:
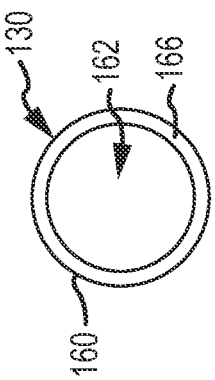
FIG. 11 is a front plan view of the sleeve of FIG. 10.

The sleeve 130 will now be discussed in more detail. FIG. 10 is a side perspective view of the sleeve 130. FIG. 11 is a front elevation view of the sleeve 130. FIG. 12 is a side elevation view of the sleeve 130. FIG. 13 is a rear elevation view of the sleeve 130. The sleeve 130 is configured to receive both portion of the nozzle 126 and the resonator 128 and operably connect the two together. Accordingly, the sleeve 130 may generally have a larger diameter than either the resonator 128 or the nozzle 126. The sleeve 130 also extends around the resonator 128 and nozzle 126 and may help prevent items, such as debris, stuffing or fabric from a surrounding component (see, FIGS. 21A and 21B) from disrupting the resonator air flow of the whistle 102, which could effect sound emission of the whistle 102.

The sleeve 130 may have a generally cylindrically shaped main body 160 defining a connection aperture therethrough. The connection aperture 162 may extend from a first end 166 of the sleeve 130 towards a second end 168. The sleeve 130 may include a plurality of sleeve apertures 164a, 164b, 164c, 164d spaced apart from one another and defined within the main body 160. In some embodiments, the sleeve apertures 164a, 164b, 164c, 164d may be located at generally the same length or location of the main body 160, such that the first sleeve aperture 164a and the third sleeve aperture 164c and the second sleeve aperture 194b and the fourth sleeve aperture 164d, respectively, may be aligned with each other on opposite sides of the main body 160 to define two passageways through a width of the main body 160. Accordingly, in these embodiments, the main body 160 may have two width passageways defined therethrough by the apertures 164a, 164b, 164c, 164d, as well as the connection aperture 162 defined lengthwise therethrough. In these embodiments, the sleeve 130 may be generally ported to allow air flow through both lengthwise and widthwise.

In some embodiments, each of the sleeve apertures 164a, 164b, 164c, 164d may have generally the same shape and dimensions. With reference to FIG. 12, the sleeve apertures 164b, 164c, 164d may each include opposing ends 174, 176 and may have an oval shape such that a diameter of a middle portion of the apertures 164a, 164b, 164c, 164d may be wider than a diameter towards the ends 174, 176. Additionally, in some embodiments, the main body 160 may include one or more depressions 172 surrounding the sleeve apertures 164a, 164b, 164c, 164d. For example, the main body 160 may include one or more inflection points 170 that may begin a transition inwards towards the connection aperture 162 to form the depressions 172. In this manner, each of the sleeve apertures 164a, 164b, 164c, 164d may be recessed from outer edge surface of the main body 160.

Figure 17:
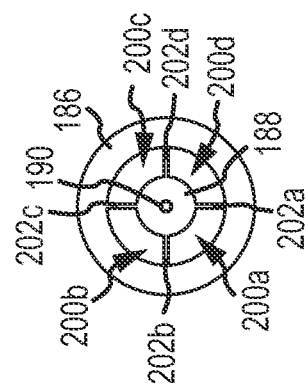
FIG. 17 is a front elevation view of the resonator of FIG. 14.
Figure 14:
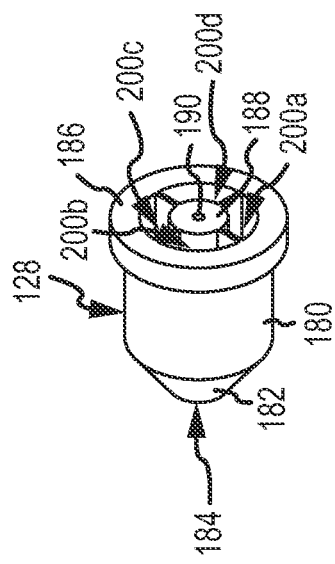
FIG. 14 is a side perspective view of a resonator for the whistle of FIG. 2.
Figure 16:
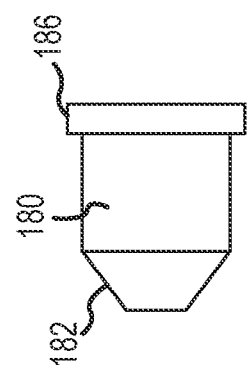
FIG. 16 is a side elevation view of the resonator of FIG. 14.
Figure 18:
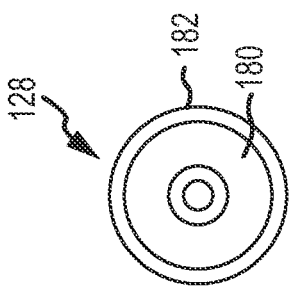
FIG. 18 is a perspective view of a pin of the whistle of FIG. 2.
Figure 15:
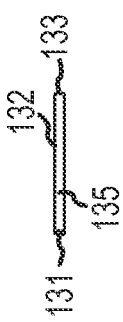
FIG. 15 is a rear elevation view of the resonator of FIG. 14.

The resonator will now be discussed in more detail. FIG. 14 is a front perspective view of the resonator 128. FIG. 15 is a rear elevation view of the resonator 128. FIG. 16 is a side elevation view of the resonator 128. FIG. 17 is a front elevation view of the resonator 128. The resonator 128 supports the pin 132 and as air flow from the bladder 104 flows from the nozzle 126 through the resonator 128 and around the pin 132, a whistle sound is produced. The resonator 128 includes a resonator body 180 that narrows towards a flow director portion 182. In this manner, the flow director portion 182 forms a conical shape that terminates at a first end of the resonator 128. The resonator 128 may have a resonator length from a first end to the second end that may be selected to be approximately one-fourth (¼) of the wavelength of the desired emitted sound. For example, for a 13.6 mm wavelength transmitted at 25 kHz, the length of the resonator may be selected to be approximately 3.4 mm. In this example, the resonator may have an aspect ratio (determined as the ratio between the produced wavelength and the length) of approximately 3.4:1, however due to the annular slit in the sleeve as defined by the pin 132 (discussed in more detail below), the aspect ratio of the resonator can be increased to have an aspect ratio of approximately 20:1, which may enhance the resonance produced by the resonator. One may appreciate that the length of the resonator may be modified slightly to account for effects of air load immediately before the resonator. Although above a wavelength of 25 kHz is discussed, other embodiments are contemplated. For example, in one embodiment, the resonator 128 may be tuned to a human-audible frequency, or in another embodiment, the resonator 128 may be tuned to adjust for particular expected operating temperatures. For example, if a resonator is expected to operate within a range of cold temperatures, it may be tuned differently but may resonate at the same frequency as a resonator expected to operate in a range of warm temperatures.

A center of the first end of the resonator 128 defines a pin aperture 184 that forms a passageway that extends through the resonator 128. The pin aperture 184 may have a diameter that may be slightly larger than a diameter of the pin 132, such that the pin may not contact the sidewalls of the aperture 184.

Figure 19:
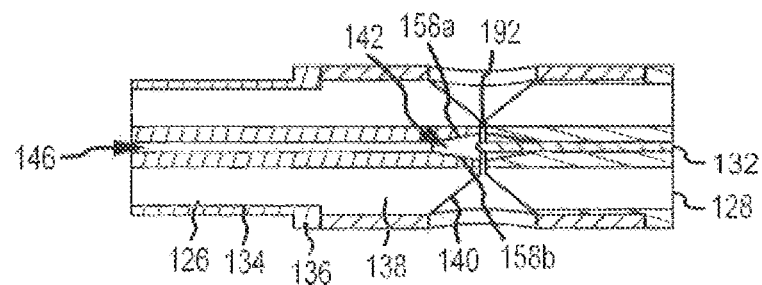
FIG. 19 is a cross-section view of the whistle of FIG. 2 taken along line 19-19 in FIG. 2.

At a second end of the resonator 128, the body 180 may expand outwards forming a collar or annular ring 186. The annular ring 186 has a diameter that is larger than the diameter of the body 180, and as shown in FIG. 19 is configured to abut the first end 166 of the sleeve 130 to retain the resonator 128 within the sleeve 130. The annular ring 186 may also be the portion of the resonator 128 that is exposed outside of the sleeve 130. With specific reference to FIG. 17, the front end of the resonator 128 may include a pin retaining cylinder 188 that includes a receiving aperture 190 defined therethrough. The pin retaining cylinder 188 may secure the pin 132 to the resonator 128 and may be spaced apart from the inner sidewalls of the resonator body 180 and held in position by a plurality of arms 202a, 202b, 202c, 202d. Between each of the arms 202a, 202b, 202c, 202d there may be a plurality of spacing apertures 200a, 200b, 200c, 200d that may be defined by the inner sidewalls of the resonator 128, the outer sidewalls of the pin retaining cylinder 188 and the sidewalls of each of the arms 202a, 202b, 202c, 202d.

The pin 132 is configured to be received within the pin retaining cylinder 188 of the resonator 128 and extend through the pin aperture 184 defined within the flow director portion 182. The pin 132 may have a main body 135 with two opposing ends 131, 133. The first end 131 may be configured to be positioned between the resonator and the nozzle, discussed in more detail below. In these embodiments, the first end 132 may have a generally hemispherical shape or another generally rounded shape that may not have a sharp or pointed profile, but rather a blunt shape. The hemispherical or paraboloid shape of the first end 131 may have a decreased flow resistance as compared to sharp profiles of conventional pins, especially at moderate subsonic speeds, as the shape has the least area in contact with airflow (wetted area) and therefore the least frictional drag.

The second end 133 of the pin may be a connection end and may be received within the pin aperture of the resonator 128. For example, the pin may be held in position by the receiving aperture 190 and thus may have a diameter that generally corresponds to a diameter of the receiving aperture 190. The connection of the pin 132 within the resonator will be discussed in more detail below.

Assembly of the noise making device 100 will now be discussed in further detail. With reference to FIGS. 4 and 19, the nozzle 126 is received into the receiving aperture 124 defined within the bladder, and the extension cylinder 134 is positioned adjacent an inner surface of the neck 108, such that air must travel through the nozzle 126 rather than around the outer surface of the cylinder 134. The pin 132 is received into the pin aperture 184 of the resonator 128 and extends past a first end of the resonator 128. The pin 132, which may have a hemispherical end shaped shape and extends only slightly past the resonator entrance. In certain embodiments, the pin 132 may extend a distance half its diameter past the resonator tip 110 without extending substantially into the nozzle.

In other words, the pin 132 may be positioned within the resonator 128 and a gap 192 between the ends of the resonator 128 and the nozzle 126. In these embodiments, because the pin 132 is still positioned within the resonator 128, but separated from the end of the nozzle 126, the pin 132 may increase the resonator aspect ratio, without substantially restricting nozzle flow or requiring enhanced precision in the pin 132 and nozzle 126 coincidence. That is, in conventional subsonic whistles, the pin extended through the resonator and the nozzle, and if the pin was not precisely coincident with the nozzle and the resonator diameter, air flow through the two components would be significantly disrupting affect the sound production. Accordingly, in many conventional whistles extreme precision ranging about 0.05 mm for the location and straightness of the pin within the nozzle and resonator was required in order to produce a desired sound. On the contrary, the whistle of the present disclosure does not require exact positioning and alignment, because it does not extend in to the resonator. Thus, the whistle can be more easily and less expensively produced than subsonic conventional whistles.

With specific reference to FIG. 19, the pin 132 may extend past the end of the resonator 128 but may terminate prior to reaching the first end of the nozzle 126. Additionally, the pin 132 may be aligned with a center of the flow aperture 142 of the nozzle 126 and positioned with a flow path of air as it flows from the flow aperture 142 away from the nozzle 126. The sleeve 130 may extend over a portion of both the resonator 128 and the nozzle 126 to operably connect the two together.

Figure 20:
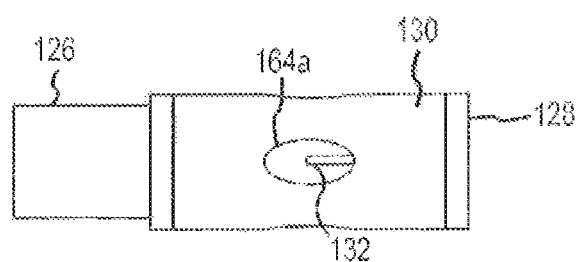
FIG. 20 is a top plan view of the whistle of FIG. 2.

The sleeve apertures 164a, 164b, 164c, 164d may be positioned so as to be aligned with the abutting ends of the resonator 128 and the nozzle 126, and the pin 132 may be visible through the sleeve apertures 164a, 164b, 164c, 164d. FIG. 20 is a top plan view of the whistle 102, illustrating the pin 132 extending from the resonator 128 towards the nozzle 126 and viewable through the sleeve apertures 164a. In this manner, the pin 132 may create an annular slit between the pin 132 and the walls of the sleeve 130 defining the apertures 164a, 164b, 164c, 164d to increase the aspect ratio of the resonator 128. An increased aspect ratio helps to enhance the resonance of the resonator 128 to produce a louder sound as air passes therethrough.

Operation of the noise making device will now be discussed in more detail. With reference to FIGS. 1, 4, and 19, the bladder 104 may be actuated by a user, such as a person or animal compressing the body 110 inwards such that the top surface 120 and the bottom surface 122 are compressed towards each other. As the bladder 104 is compressed, air stored within the cavity defined by the body 110 is forced outwards through the neck 108. The nozzle 126, positioned within the neck 108 then directs the air flow through the decreased diameter of the flow aperture 142, which increases the velocity of the air flow. Since the resonator 128 is closed at one end, all airflow exits through the flow aperture 142. As some air cyclically enters and exits the entrance of the resonator, a sound is emitted.

As flow exits the whistle 102 a sound is emitted. The sound may be in the ultrasonic frequency range due to the tuned nozzle 126 which may increase the velocity of the air flow as it exits the flow aperture. Additionally, the sound intensity may be sufficiently high to be able to be transmitted through one or more layers of material, such as a toy enclosing a portion of the device.

Figure 21A:
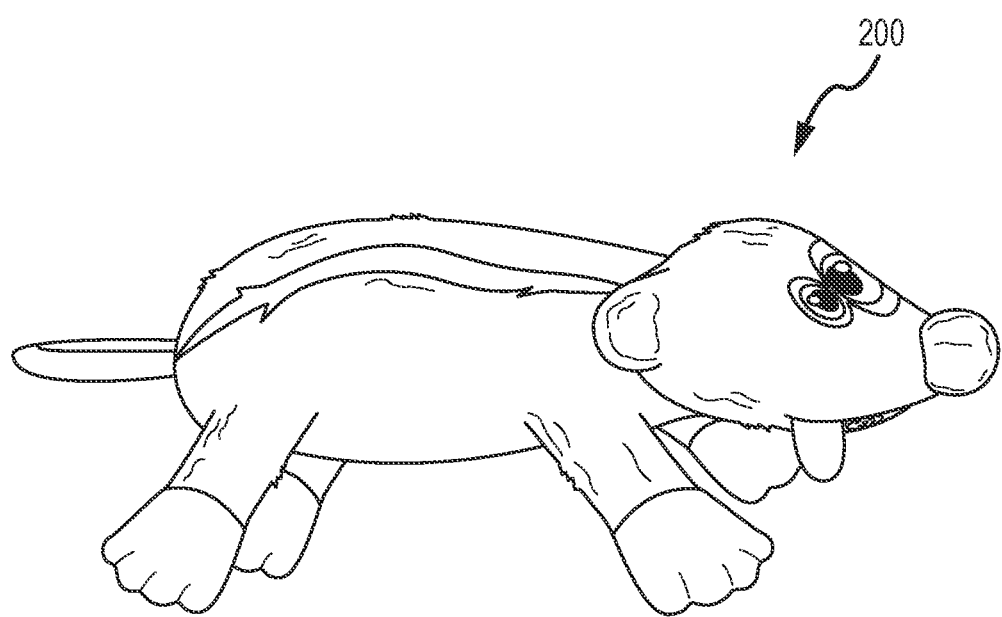
FIG. 21A is a side perspective view of the ultrasonic noise device operably connected to a toy.
Figure 21B:
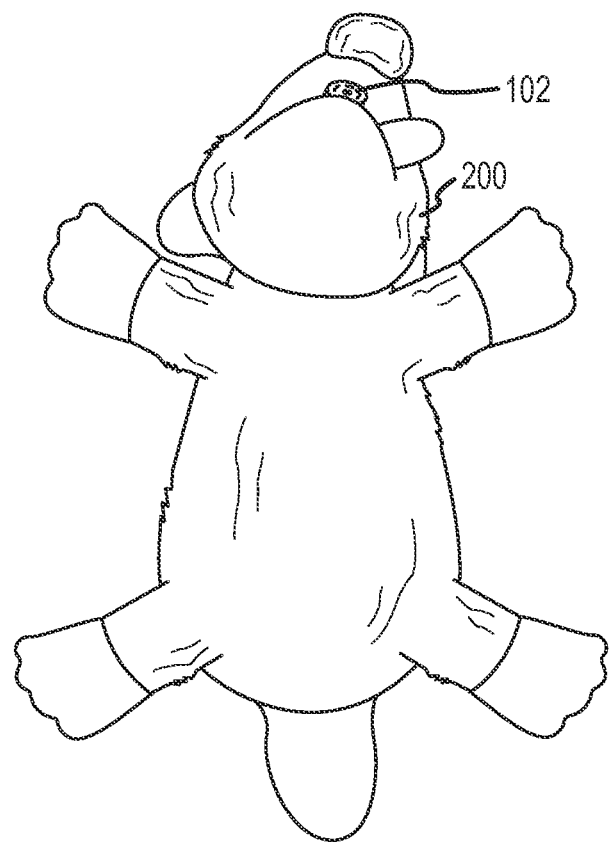
FIG. 21B is a top plan view of the toy and ultrasonic noise device of FIG. 21A.

As generally described above, the noise making device 100 may be used to entertain animals, such as domestic dogs and/or cats. FIGS. 21A and 21B illustrate various views of the noise making device 100 operably connected to a toy 200. As shown in FIGS. 21A and 21B, the end of the whistle 102 may be exposed outside of the toy 200, which may be a stuffed animal, such as a plush toy. This may allow air communication between the bladder 104 and the outside environment of the toy 200, although the bladder 104 may be enclosed within the toy 200. Further, because the whistle 102 is at least partially exposed, sound emitted therefrom may be transmitted outside of the toy to be better heard by the animal. In these embodiments, the sleeve 130 may help prevent fabric and/or stuffing from the toy to enter into the resonator air flow.

It should be noted that although the toy 200 is illustrated as a stuffed animal, the noise making device 100 may be operably connected to a variety of different toys, such as but not limited to, balls, chew toys, ropes, and so on. In yet other embodiments, the whistle may be used separately from a toy, such as a training device or a communication device to call animals using an ultrasonic noise frequency.

CONCLUSION

The foregoing description has broad application. For example, while examples disclosed herein may focus on toys for animals it should be appreciated that the concepts disclosed herein may equally apply to substantially any other type of application where an ultrasonic noise is desired. Accordingly, the discussion of any embodiment is meant only to be exemplary and is not intended to suggest that the scope of the disclosure, including the claims, is limited to these examples.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary

What is claimed is:

1. An ultrasonic noise device, comprising:
   a compressible bladder defining an air retaining cavity;
   a nozzle operably connected to the bladder and fluidly connected to the air retaining cavity, the nozzle including a nozzle flow pathway extending from a first end of the nozzle to a second end of the nozzle;
   a resonator operably connected to the nozzle and defining a resonator flow pathway in fluid communication with the nozzle flow pathway; and
   a pin positioned at least partially within the nozzle flow pathway and aligned with the nozzle flow pathway; wherein
   a first end of the pin extends towards but does not reach a tip of the nozzle.

2. The ultrasonic noise device of claim 1, further comprising a sleeve at least partially surrounding the resonator and the nozzle and operably connecting the nozzle and the resonator together.

3. The ultrasonic noise device of claim 2 wherein the sleeve further includes
   a main body having a length and defining a connection aperture therethrough;
   a plurality of sleeve apertures defined within the main body, each of the plurality of sleeve apertures being spatially separated from one another and extending longitudinally along the length of the main body.

4. The ultrasonic noise device of claim 3, wherein the sleeve further includes a plurality of depressions, wherein each respective depression in the plurality of depressions surrounds a respective one of each of the sleeve apertures of the plurality of sleeve apertures.

5. The ultrasonic noise device of claim 1, further comprising a fabric material at least partially surrounding the compressible bladder.

6. The ultrasonic noise device of claim 1, wherein the first end of the pin has a hemispherical shape.

7. The ultrasonic noise device of claim 6, wherein the nozzle further includes an annular collar positioned between the connection nozzle and the tapered tip.

8. The ultrasonic noise device of claim 1, wherein the nozzle, resonator, and pin are configured to emit a sound ranging between 22 to 28 kHz.

9. The ultrasonic noise device of claim 1, wherein the nozzle further includes
   a connection cylinder; and
   a tapered tip extending from the connection cylinder; wherein
   the nozzle flow passageway enlarges at the tapered tip towards an end of the nozzle; and
   the connection cylinder is at least partially received into a receiving aperture in the compressible bladder.

10. An animal entertainment device, comprising:
    a bladder defining a cavity for retaining air;
    an ultrasonic whistle fluidly connected to the bladder, the ultrasonic whistle comprising
    a nozzle operably connected to the bladder;
    a resonator operably connected to the nozzle but spaced apart from a front end of the nozzle; and
    a pin operably connected to the resonator and terminating prior to the front end of the nozzle, the pin having a hemispherical shaped end oriented towards the nozzle; wherein
    as the bladder is compressed air exists through the ultrasonic whistle and creates an ultrasonic sound.

11. The animal entertainment device of claim 10, further comprising a covering element at least partially concealing the bladder.

12. The animal entertainment device of claim 11, wherein the covering is a plush material.

13. The animal entertainment device of claim 10, wherein the ultrasonic whistle further comprises a sleeve operably connected to the resonator and the nozzle, wherein the sleeve surrounds at least a portion of the nozzle and the resonator.

14. The animal entertainment device of claim 13, wherein the sleeve further comprises a first sleeve aperture and a second sleeve aperture defined on an opposite side of the sleeve from the first sleeve aperture, wherein the pin as it extends from the resonator bisects the first sleeve aperture and the second sleeve aperture.

15. The animal entertainment device of claim 10, wherein the nozzle further includes a flow aperture defined through a center of a main body, the flow aperture having a first diameter at a first end of the nozzle and a second diameter at a second end of the nozzle.

16. The animal entertainment device of claim 15, wherein the second end of the nozzle is positioned adjacent a first end of the resonator.

17. The animal entertainment device of claim 10, wherein the bladder is injected molded plastic.

18. The animal entertainment device of claim 10, wherein the pin is at least partially received in a receiving aperture defined in a center of the resonator.

19. The animal entertainment device of claim 10, wherein the pin has a diameter ranging between 0.70 to 0.80 mm.

20. The animal entertainment device of claim 10, wherein the ultrasonic sonic whistle is emits sounds waves ranging between 22 to 28 kHz.

* * * * *